United States Patent Office 3,030,333
Patented Apr. 17, 1962

3,030,333
LIGHT STABILIZED POLYPROPYLENE
Galvin M. Coppinger, Oakland, Calif., assignor to Shell Oil Company, New York, N.Y., a corporation of Delaware
No Drawing. Filed Aug. 12, 1958, Ser. No. 754,527
1 Claim. (Cl. 260—45.7)

This invention relates to polymers of propylene having improved stability. More particularly it relates to such polymers which have improved stability against light degradation.

Polymers of propylene produced by the so-called "low pressure methods" are now well-known in the art. Such polymers are characterized by a variety of desirable physical properties that make them particularly suitable for the manufacture of molded goods, films, fibers, and the like. The polypropylene has unique structural characteristics and is sometimes referred to as "high density" polypropylene. The high density polypropylene produced by the low pressure methods is also characterized by the presence of catalyst residues within the polymer particularly catalyst residues which comprise metals of group IV A of the periodic table in addition to which aluminum may be present. These catalyst residues are in the polymer by reason of the method of producing the polymer which employs any of a variety of the so-called low pressure catalysts which may be for example, a reaction product of an aluminum alkyl and a group IV A metal halide as titanium trichloride. The low pressure catalyst residues which remain in the polymer are known to be particularly harmful in that they cause the polymer to lose stability on aging. In order to avoid the harmful effect of these catalyst residues it has been the practice to treat the polymer in order to separate the catalyst residues as completely as possible. However, it appears that some of the catalyst residue always remain and it has not yet been possible to separate it completely from the polymer. The result is that the high density polypropylene prepared with low pressure catalysts have lacked the desired stability particularly the stability to light degradation.

It is an object of this invention to provide polypropylene which has improved light stability. It is another object of this invention to produce particularly the high density polypropylene which has improved stability to light. Other objects will become apparent as the description of the invention proceeds.

These and other objects are accomplished with a composition which comprises polypropylene and an organic compound having a strong absorption spectrum below 3000 Angstrom units. Organic compounds having the required absorption spectrum will operate to impart improved light stability to the polypropylene which polymer contains catalyst residues of a group IV A metal. The catalyst residues may include, for example, titanium, zirconium, cadmium and thorium. These residues are those which remain in the polymer from the catalyst which normally are halides of the metals, particularly chlorides although oxychloride and the like may be the source of the group IV A metal residue. In addition to metal residues of the type described the polymer may contain other metal residues which originate with the catalyst. Such metal residues include particularly aluminum which originates with the aluminum alkyl component of the catalyst composition. Additionally, the polymer usually contains other impurities as iron. The iron may find its way into the polymer when steel reactors are used for the polymerization. In general the group IV A metal is believed to impart poor light stability to the polymer and if iron is present it too is believed to be particularly harmful. Metal residues such as aluminum are believed to be less harmful in addition to which such residues are usually present in lesser amounts because they are easier to separate from the polymer.

The compositions of the present invention do not rely upon any particular method for the production of the polymer other than it contains a group IV A metal which will be understood to be present by reason of the use of such metal compounds in the polymerization process. It follows then that the polymer of the mono-alpha-olefins of this invention are the high density or low pressure type.

The organic compounds which impart the improved light stability to the compositions of this invention are characterized as having strong absorption spectrum below 3000 Angstrom units. While this invention is not limited by any theoretical considerations it may be helpful to a better understanding of the invention to consider a possible theoretical explanation of why organic compounds having the required absorption spectrum are operable for the purposes of this invention. It is possible that organic compounds having strong absorption below 3000 Angstrom units will compete with the polypropylene in absorption of light of these wave lengths. This will prevent light catalyzed oxidation of the polymer. Even though there will probably be attrition of the organic compounds through homolytic bond clearance by absorption of light this will not cause oxidation of the polymer. In any case not all organic compounds having the required absorption spectrum are equal but those having continuous absorption in the region of 3000 to 2000 Angstrom units are best. Representative compounds within the preferred classes of additives include, for example, phenylphthalate, bis(phenoxyphenyl) ether, di-p-phenoxybenzene, 4-t-butyl-2-phenyl phenylphthalate, beta-naphthylbenzoate and the like.

The quantity of the additive which is employed will vary depending on several factors such as the amount and nature of the contaminates, or catalyst residues, in the polymer, the species of additives and the like. In general amounts ranging from 0.05% to 5%, by weight, of the polymer will be satisfactory in most cases. Normally, however, amounts in the order of about .5–3%, by weight, are suitable. It will be appreciated that if lesser amounts are employed improved light stability will be obtained but the amount thereof may be lowered. However, the use of amounts in excess of about 5%, by weight, of the polymer will not normally impart any substantial improvement in the light stability.

In addition to containing the additives to impart improved light stability, the compositions of this invention may also contain a variety of other materials which may be incorporated into the composition to achieve a specific purpose. This is represented, for example, by the use of pigments and coloring material. Additionally, the compositions of this invention may also contain extenders, fillers and similar ingredients which may be employed in specific formulations, in order to provide improved impact strength. Still another group of materials which may be added to the compositions of this invention include oxidation inhibitors. Such inhibitors will normally be employed in the compositions of this invention because the polymers produced by the low pressure methods are prone to degradation from oxidation. Such inhibitors may be any of the well known oxidation inhibitors selected from that large class of compounds known as alkylated phenols and bis phenols and includes for example, 2,6-di-tertbutyl-p-cresol, bis(3-t-butyl-5-methyl-2-hydroxylphenyl) methane, and the like. The oxidation inhibitors are normally employed in amounts ranging from about 0.01% to about 3%, by weight, of the polymer.

Light degradation of the polypropylene is characterized in several ways. For one thing, polypropylene which has undergone degradation due to light will darken. Test strips, which may be thin films, became opaque. The degree of opaqueness may be used as an indication of the degree of degradation. Another characteristic is that the polymer will undergo embrittlement with increased degradation and a useful method of determining the degree of embrittlement is by stretching the polymer strip and observing the ease with which the film breaks. Another method for determining embrittlement involves the use of infra-red analysis to determine the carbonyl values on films via the stretching bands.

The usefulness of the present invention in reducing degradation from light is indicated in the following table wherein the tests were made on polypropylene prepared by the usual low pressure method with a catalyst prepared by mixing aluminum diethylchloride and titanium trichloride. After the polymer has been separated and washed in a lower alcohol to reduce the catalyst residues, the indicated additive is dissolved in a hydrocarbon solvent such as isopentane. Thereafter the polypropylene is slurried with a solution of the additive in isopentane to give a total additive content of about 1% by weight. Thereafter the solvent for the additive is removed by evaporation. The remaining polymer is then pressed for three minutes at about 1500 pounds per square inch at 200° C. to give films that range from 10–20/1000 of an inch in thickness. The films thus prepared are exposed to the outdoor weathering for the period of time indicated. The test samples also contain .05%, by weight, of bis(3-tert-butyl-5-methyl-2-hydroxyphenyl)-methane, referred to hereafter at "2,2,4,6."

Table I

| Example | Additive | Oxidation Factor | Days |
|---|---|---|---|
| 1 | None | 1.0 | <30 |
| 2 | Beta-naphthylbenzoate | .6 | 121 |
| 3 | Phenylbenzoate | .8 | 121 |
| 4 | Penylphthalate | 0 | 150 |
| 5 | p-cresylbenzoate | .51 | 103 |
| 6 | Bis(phenoxyphenyl)ether | 0 | 150 |
| 7 | Di-p-phenoxybenzene | 0 | 150 |
| 8 | 4-t-butyl-2-phenylphenyl benzoate | 0 | 150 |

Test samples 4, 6–8 are still being exposed.

The oxidation factor is a relative number that indicates the formation of carbonyl values. Higher number indicates higher carbonyl content. The blank failed in less than 30 days by embrittlement test. From the table it will be seen that some species are preferred to others.

By increasing the amounts of the additives shown in the table as having positive oxidation factors the carbonyl values may be reduced. Similarly those having zero oxidation values may be suitably employed in lesser amount.

In another series of tests, unstabilized, high density polypropylene which is available through normal commercial channels in the U.S. is slurried with an acetone solution of the indicated additives after which the acetone is evaporated. The polymer containing the additive(s) is then pressed into films as indicated above. The films are then exposed in an Atlas Weatherometer Model XW in which the water cycle is not used. Table II gives the results in which the time interval is the period in which the sample began to fail to the time it failed by a hand embrittlement test.

Table II

| Example | Additive | Time, hrs. |
|---|---|---|
| 9 | None | 54–72 |
| 10 | 2-naphthylsalicylate, 1% | 247–265 |
| 11 | Same+.05% "2,2,4,6" | 282–300 |
| 12 | Phenylphthalate, 1% | 229–247 |
| 13 | Same+.05% "2,2,4,6" | 247–265 |
| 14 | P,P'-diphenoxydiphenyl ether 1%+.05% "2,2,4,6." | 455–473 |
| 15 | Bis(phenoxyphenyl)ether, 1% | 335–352 |
| 16 | Same+.05% "2,2,4,4" | 445–473 |
| 17 | 4-t-butyl-2-phenylphenyl benzoate, 1% | 300–317 |
| 18 | Same+.05% "2,2,4,6" | 404–421 |

The present invention may be modified in many ways. Thus for example, the methods for adding or blending the additives may be modified as desired such as by using milling apparatus. In such a case care should be exercised to provide adequate milling time in order to provide a homogeneous product. Any of the numerous methods and techniques for producing the polymer may be employed without departing from the spirit of the invention. Comprehensive methods for the production of high density polypropylene are given in British Patent 777,538, which methods may be modified to produce high density polyethylene as is well known in the art.

I claim as my invention:

Compositions comprising a solid polymer of propylene and from 0.05 to 5% by weight of the polymer of p,p'-diphenoxydiphenyl ether, the composition also containing traces of a metal selected from group IV A of the periodic table.

References Cited in the file of this patent

UNITED STATES PATENTS

| | | |
|---|---|---|
| 2,157,068 | Carruthers et al. | May 2, 1939 |
| 2,448,799 | Happoldt et al. | Sept. 7, 1948 |
| 2,834,768 | Friedlander | May 13, 1958 |
| 2,852,488 | Clark et al. | Sept. 16, 1958 |
| 2,861,053 | Lappin et al. | Nov. 18, 1958 |
| 2,874,146 | Deverell-Smith et al. | Feb. 17, 1959 |

FOREIGN PATENTS

| | | |
|---|---|---|
| 652,730 | Great Britain | May 2, 1951 |

OTHER REFERENCES

Raff: Polyethylene High Polymers, vol. XI, Pub. by Interscience, New York, copyright 1956, pages 99–108.

Chevassus: La Stabilization Des Chlorures De Polyvinyl Amphora, Paris, copyright 1957, pages 79–88.